(12) United States Patent
Shaw et al.

(10) Patent No.: US 10,795,951 B2
(45) Date of Patent: Oct. 6, 2020

(54) METHOD, COMPUTER-READABLE STORAGE DEVICE AND APPARATUS FOR UTILIZING COMPANION AND EVENT INFORMATION

(71) Applicant: AT&T Intellectual Property I, L.P., Atlanta, GA (US)

(72) Inventors: Venson Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 384 days.

(21) Appl. No.: 14/979,213

(22) Filed: Dec. 22, 2015

(65) Prior Publication Data

US 2017/0177674 A1 Jun. 22, 2017

(51) Int. Cl.
| | |
|---|---|
| G06F 7/00 | (2006.01) |
| H04L 29/06 | (2006.01) |
| G06F 16/30 | (2019.01) |
| G06F 16/9535 | (2019.01) |
| H04L 29/08 | (2006.01) |
| G06Q 50/26 | (2012.01) |
| G06Q 50/14 | (2012.01) |

(52) U.S. Cl.
CPC ....... *G06F 16/9535* (2019.01); *G06Q 50/265* (2013.01); *H04L 63/0414* (2013.01); *H04L 63/102* (2013.01); *H04L 67/22* (2013.01); *G06Q 50/14* (2013.01)

(58) Field of Classification Search
CPC .......... G06F 17/30867; G06F 16/9535; G06Q 50/14; G06Q 50/265; H04L 63/0414; H04L 67/22; H04L 63/102

USPC ......................................................... 707/722
See application file for complete search history.

(56) References Cited

U.S. PATENT DOCUMENTS

| | | | |
|---|---|---|---|
| 6,526,351 B2 * | 2/2003 | Whitham | G01C 21/343 701/438 |
| 8,019,692 B2 | 9/2011 | Rosen | |

(Continued)

FOREIGN PATENT DOCUMENTS

KR      20090077537      7/2009

OTHER PUBLICATIONS

Durugkar, Sneha M. "Privacy Protection in Personalized Web Search Using Metric Prediction". *International Journal of Scientific Engineering and Research (IJSER)*. Sep. 2015. pp. 1-4.

(Continued)

*Primary Examiner* — Kuen S Lu (57) ABSTRACT

Methods, computer-readable storage media and apparatuses for utilizing privacy information to improve a user experience are disclosed. A processor receives privacy information of a user, the privacy information comprising location information and at least one of: traveling companion information and event information, receives over a communication network associated with the network service provider, a search request, determines search results responsive to the search request, wherein the search results are generated by accounting for the location information and at least one of: the traveling companion information and the event information, and provides over the communication network associated with the network service provider, the search results to an endpoint device of the user.

20 Claims, 4 Drawing Sheets

(56) References Cited

U.S. PATENT DOCUMENTS

| | | | |
|---|---|---|---|
| 8,566,026 B2* | 10/2013 | Bouve | G01C 21/00 |
| | | | 257/59 |
| 9,170,863 B2 | 10/2015 | Varoglu et al. | |
| 9,183,504 B2 | 11/2015 | Moore et al. | |
| 2003/0004940 A1 | 1/2003 | Igarashi | |
| 2007/0192277 A1 | 8/2007 | Jackson | |
| 2009/0313055 A1* | 12/2009 | Martin | G06Q 10/02 |
| | | | 705/6 |
| 2010/0063934 A1* | 3/2010 | Khoo | G06Q 10/025 |
| | | | 705/319 |
| 2010/0205060 A1* | 8/2010 | Athsani | G01C 21/3484 |
| | | | 705/14.58 |
| 2012/0311684 A1* | 12/2012 | Paulsen | H04L 63/0815 |
| | | | 726/6 |
| 2013/0024391 A1 | 1/2013 | Vakil et al. | |
| 2014/0046591 A1 | 2/2014 | Boldyrev et al. | |
| 2015/0120407 A1 | 4/2015 | Deshpande et al. | |
| 2015/0149556 A1 | 5/2015 | Liu et al. | |
| 2015/0261844 A1 | 9/2015 | Ramalho | |
| 2015/0356126 A1 | 12/2015 | Kasravi et al. | |
| 2017/0046802 A1* | 2/2017 | Zhang | G06F 16/9535 |
| 2017/0091765 A1* | 3/2017 | Lloyd | G06Q 20/32 |

OTHER PUBLICATIONS

Xu, Yabo "Privacy-Enhancing Personalized Web Search". May 2007. pp. 1-10.

* cited by examiner

FIG. 4

METHOD, COMPUTER-READABLE STORAGE DEVICE AND APPARATUS FOR UTILIZING COMPANION AND EVENT INFORMATION The present disclosure relates generally to communication networks and, more particularly, to methods, computer-readable storage devices and apparatuses for utilizing privacy information to improve a user experience.

BACKGROUND

Consumers are becoming ever more protective of their personal data. For example, consumers are concerned with respect to identity theft and misuse of their personal data. However, although consumers are worried as to how their data will be used, consumers are nevertheless willing to provide consent to allow companies to use their personal data under certain scenarios, e.g., to receive product/services deemed important to the consumers, e.g., geo-location information pertaining to the consumers may be required to provide services that are location based. In other words, consumers are generally willing to give consent to the use of their personal data to support the innate functionality of a particular subscribed service.

On the flip side, companies are interested in accessing consumers' data (i.e., big data) to provide better services and/or to promote new business opportunities. This creates a tension between consumers who want to control how their personal data will be used and companies that want to access such big data to provide services to the consumers.

SUMMARY

In one example, the present disclosure discloses methods, computer-readable storage media and apparatuses for utilizing privacy information to improve a user experience. A processor receives privacy information of a user, the privacy information comprising location information and at least one of: traveling companion information and event information, receives over a communication network associated with the network service provider, a search request, determines search results responsive to the search request, wherein the search results are generated by accounting for the location information and at least one of: the traveling companion information and the event information, and provides over the communication network associated with the network service provider, the search results to an endpoint device of the user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for utilizing privacy information to improve a user experience. Although the present disclosure is discussed below in the context of wireless access networks and an Internet Protocol (IP) network, the present disclosure is not so limited. Namely, the present disclosure can be applied to packet switched or circuit switched networks in general, e.g., Voice over Internet Protocol (VoIP) networks, Service over Internet Protocol (SoIP) networks, Asynchronous Transfer Mode (ATM) networks, Frame Relay networks, and the like.

In one example, the present disclosure provides a searching service for utilizing privacy information to improve a user experience. It is often the case that consumers are requested to provide certain personal information to allow companies, e.g., service providers, manufacturers, retailers and the like, to utilize a certain amount of their personal data in order to provide one or more innate functionalities. For example, a cellular service provider may request that a consumer consents to have his or her physical location information or data (broadly geo-location information) be used to provide the innate functionality of receiving cellular service. In other words, the cellular service provider must be able to determine the consumer's physical location in order to forward cellular calls to the consumer. Similarly, a mortgage company or a banking institution may request that a consumer consents to have his or her financial information or data be used and verified to receive the innate functionality of receiving a mortgage or a loan. In yet another example, a medical institution may request that a consumer consents to have his or her medical information or data be used and verified to receive the innate functionality of receiving a proper diagnosis of a potential ailment or disease. In yet another example, a media delivery service provider may request that a consumer consents to have his or her media viewing information or data be used and tracked to receive the innate functionality of receiving a notification of a future program that may be of interest to the consumer. In yet another example, a traffic notification service provider may request that a consumer consents to have his or her current location information or data be used and tracked to receive the innate functionality of receiving up to date traffic conditions on a route that the consumer is currently traveling on.

The above list of examples is only illustrative and not exhaustive. It is noted that consumers are becoming ever more protective of their personal data. For example, consumers are concerned with respect to identity theft and misuse of their personal data. However, as illustrated by the above examples, although consumers are worried as to how their data will be used, consumers are nevertheless willing to provide certain amount of personal information to allow companies to use their personal data under certain scenarios, e.g., to receive product/services deemed important to the consumers. In other words, consumers are generally willing to give consent to the use of their personal data to support the innate functionality of a particular subscribed service.

The above examples also illustrate another reality of the modern world that consumers are facing. The reality is that consumers are often requested to provide their personal information in order to receive various services and/or products. However, users may be very suspicious or fearful of service providers, e.g., a "search provider" providing search results in response to a search request received from a user. The suspicion or fear is that the service provider may misappropriate the user's privacy information. As a result, the user is unwilling to provide more pertinent information that will assist the service provider in providing more pertinent search results.

For example, a user may provide a search request for locating flights from one origin city to a destination city for a particular date. However, no additional privacy information is provided to the search provider such as the purpose of traveling to the destination city. Similarly, the user may provide the number of passengers, e.g., two adults, but there is additional privacy information as to the relationship of the two adults. It is often the case that the user feels that such information is not necessary to be provided to the search provider and that such privacy information may not even be relevant for the search request. Although the user's sentiment may be correct in some scenarios, in other situations such privacy information may provide far more accurate search results that will enhance the user's experience.

To illustrate, if the user is traveling with a companion instead of traveling alone, the search results in response to a search request for a restaurant can be better tailored to parties of two or more. For example, single travelers may want to dine in more casual settings or is willing to frequent establishments that are known to be frequented by singles. Without having access to this type of privacy information, the search provider will not be able to adjust the search results, e.g., presenting restaurant recommendations in a higher order or near the top of a list that are more tailored to single travelers. Similarly, even if the search provider is given the privacy information that two people are traveling, the relationship of these two people are unknown, e.g., a couple (e.g., a married couple or two people in a relationship) traveling versus two co-workers traveling. For example, a married couple may be willing to share a hotel room with a single bed, whereas two co-workers traveling may find that arrangement to be objectionable. Again, without having access to this type of privacy information, the search provider will not be able to adjust the search results, e.g., presenting hotel availability for rooms with two beds ahead (e.g., at a higher order) of rooms with a single bed to two co-workers traveling and vice versa for a married couple.

Again, even if the search provider is given the privacy information that two people who are a married couple are traveling, the purpose of the trip, e.g., the type of event that the two people are attending, is still unknown, e.g., a married couple traveling for vacation versus a married couple traveling to a convention for work where one spouse is simply traveling along as a companion. Again, without having access to this type of privacy information, the search provider will not be able to adjust the search results, e.g., presenting local events where one of the spouse is able to attend while the other spouse is attending the convention. For example, the search results may prioritize events that are more tailored to individuals who may need to occupy themselves for a short period of time during the day, e.g., museum events, street fair events versus discount tickets for a golf event for a group of people. In turn, at night time the search results may then prioritize events that are more tailored to married couples again, e.g., presenting dining options that are more conducive to a traveling married couple.

Thus, in one embodiment of the present disclosure, a search provider will utilize a combination of privacy information to provide search results that will enhance the user experience. For example, the combination may combine location information with one or more types of privacy information such as travel companion information and event information. In one embodiment, the user having provided certain types of privacy information may opt to have the provided privacy information be immediately deleted by the search provider once the search results are provided. However, the user may also opt to have the provided privacy information be stored by the search provider once the search results are provided, e.g., indefinitely or for a period of time defined by the user, e.g., one week, two weeks, a duration of the trip, and so on.

In one embodiment of the present disclosure, a privacy information management service is provided by a network service provider to receive and store privacy information for the user, which can then be used in a searching service responsive to a search request received from the user. In one embodiment, the term "privacy information" comprises location information, travel companion information, and event information. For example, location information may comprise information relating to a location of interest associated with the user, e.g., current location information provided by a global positioning system (GPS) with latitude and longitude coordinates. However, location information does not need to be a current location of the user. For example, a user may want to find a type of restaurant in New York City, but the user is currently in Seattle. Thus, the granularity or accuracy of the location information may range from specific location coordinates to large areas represented by towns, counties, states or even countries.

In one example, travel companion information may comprise information relating to whether user is traveling with a companion, e.g., traveling: 1) alone, 2) with a companion, or 3) with a family. The travel companion information may also comprise the relationship status of the companion, e.g., a friend (e.g., a friend companion), a family member (e.g., a family companion), or a colleague (e.g., a business companion).

In one example, event information may comprise a type of event, e.g., a personal event (e.g., attending a family gathering, a sports viewing event such as a baseball game, a vacation, and so on), or a business event (e.g., attending a convention, a business dinner, a sales pitch, and so on). In one example, the business event can be provided with additional granularity, e.g., a dinner meeting with a vendor versus a meeting with a potential client. For example, a user searching for a restaurant to meet with a potential client who may give new business to the user may have different requirements versus when the user is searching for a restaurant to meet with an intern or a vendor looking to get a job or business from the user instead.

In one embodiment, the "privacy information" may further comprise additional information provided by the user, e.g., contact information (e.g., home address, work address, email addresses, home phone number, work phone number, mobile phone number and the like), and various personal preferences as related to lodging preferences, transportation preferences, eatery preferences, entertainment preferences, financial preferences, medical preferences, and the like. It should be noted that the above list of privacy information is not exhaustive.

Figure 1:
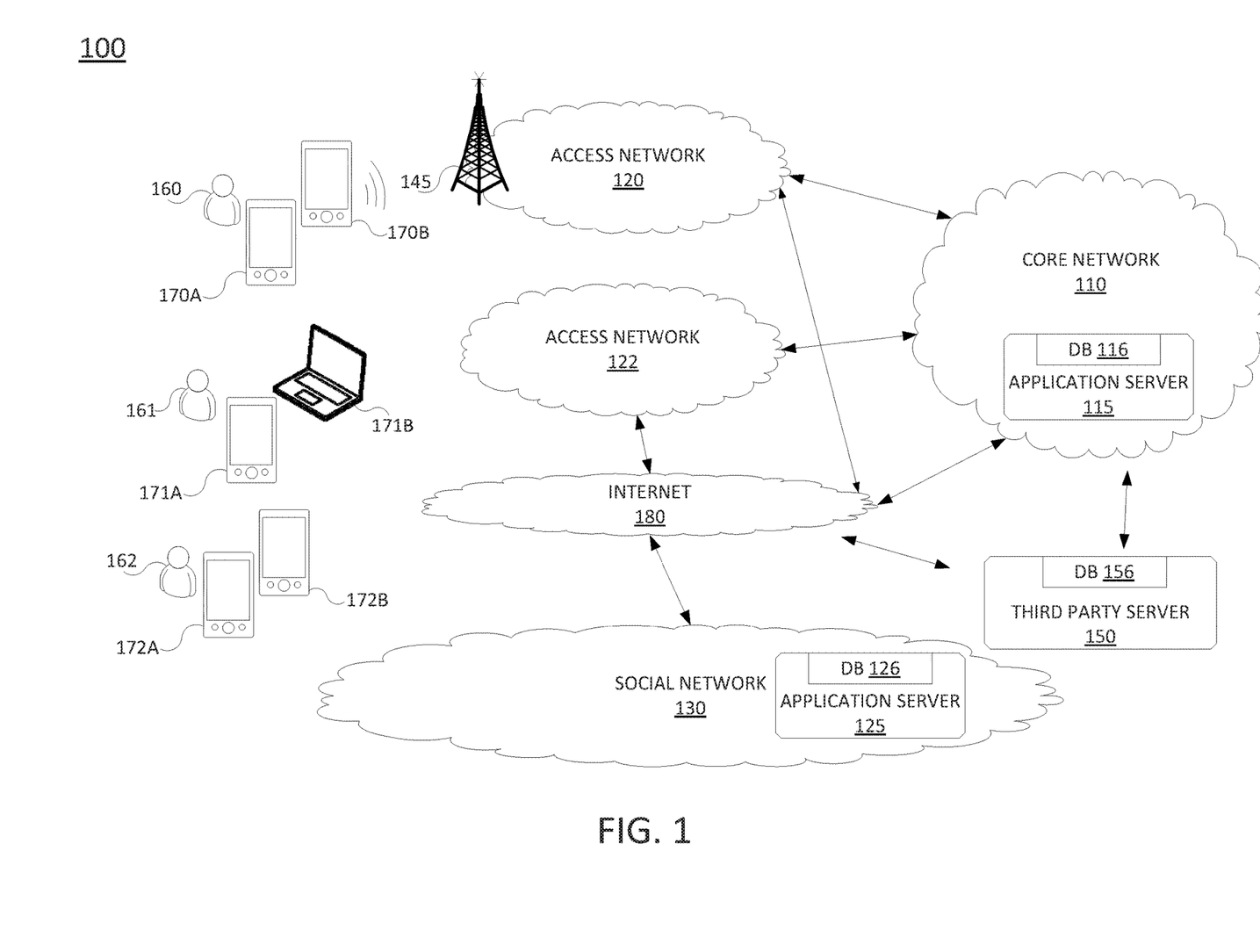
FIG. 1 illustrates an example network related to the present disclosure.

To aid in understanding the present disclosure, FIG. 1 illustrates a block diagram depicting one example of a communication network 100 suitable for performing or enabling the steps, functions, operations and/or features described herein. The overall communication network 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and so forth. It should be noted that an IP network is broadly defined as a network that uses Internet Protocol to exchange data packets.

As shown in FIG. 1, the communication network 100 connects endpoint devices 170A-172A and 170B-172B with each other and/or with one or more application servers via a core network 110, access networks 120 and 122, social network 130 and/or Internet 180. In one embodiment, core network 110, e.g., an IP network, interfaces with one or more of the access networks 120 and 122, and may also include interfaces to the Internet 180 and/or social network 130. Access network 120 may comprise a wireless access network (e.g., an IEEE 802.11/Wireless-Fidelity (Wi-Fi) network and the like) or a cellular access network, and may include a cellular base station and/or wireless access point 145. In one embodiment, access network 122 may comprise a PSTN access network, a cable access network, a wired access network and the like. In one embodiment, the access networks 120 and 122 and the core network 110 may be operated by different service providers, the same service provider or a combination thereof. Various interconnections between access networks 120 and 122, core network 110, Internet 180 and social network 130 are shown. In accordance with the present disclosure, it is contemplated that devices may utilize any one or a combination of such networks and interfaces in order to communicate with one another.

Figure 4:
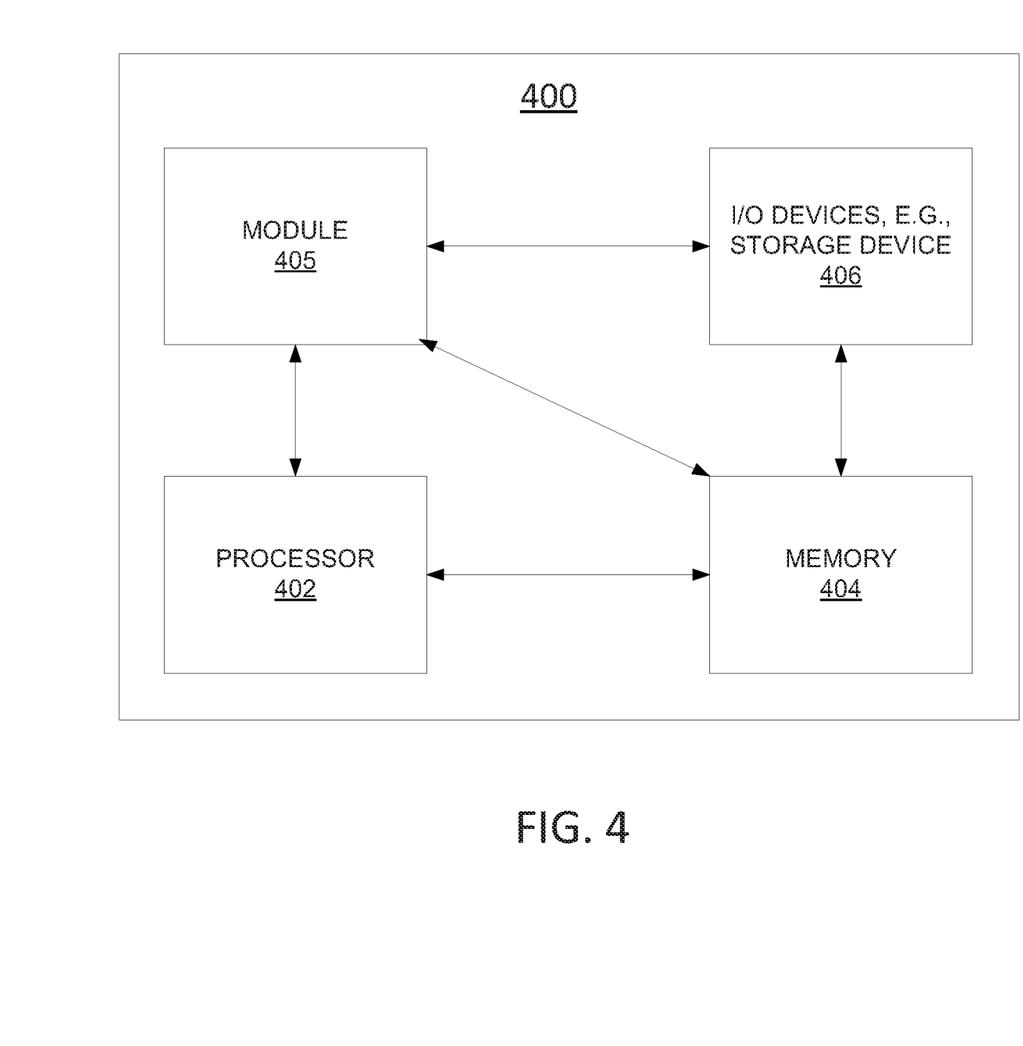
FIG. 4 illustrates a high-level block diagram of a computer suitable for use in performing the functions described herein.

In one embodiment, the core network 110 may include an application server (AS) 115, e.g., a dedicated database server and a database (DB) 116. Although only a single AS 115 and a single DB 116 are illustrated, it should be noted that any number of application servers 115 or databases 116 may be deployed. In one embodiment, the AS 115 may comprise a programmed computing device as illustrated in FIG. 4 and discussed below. In one embodiment, the AS 115 is configured to perform steps, functions and/or operations of a privacy information management service, e.g., for using the stored privacy information to perform a search function for the user, accordance with the present disclosure. As such, DB 116 may store program code, data, files, and so forth to enable such functions. Thus, various embodiments are described herein as residing in or being performed in whole or in part by AS 115. For instance, AS 115 may receive and store the privacy information of a plurality of users (e.g., subscribers of network services from the network service provider of network 102) and use the stored privacy information to answer inquiries presented by various third party business entities on behalf of the users.

In one example, social network 130 may also include an application server (AS) 125 and a database (DB) 126, which may be the same or similar to AS 115 and DB 116 in the core network 110 and which are also suitable to perform at least the same functions. Similarly, in another embodiment one or more application servers (not shown), e.g., connected to Internet 180, may perform the same or similar functions. In other words, one or more application servers as deployed in a cloud environment may implement the functions as discussed herein.

In one embodiment, each of endpoint devices 170A-172A and 170B-172B may comprise an endpoint device configured for wireless or wired communication such as a personal computer, a laptop computer, a Personal Digital Assistant (PDA), a mobile phone, a smart phone, an email device, a computing tablet, a messaging device, a computing pair of glasses, and the like. As illustrated in FIG. 1, endpoint devices 170A-172A and 170B-172B may belong to and/or be associated with users 160-162, respectively. In particular, each of users 160-162 may have multiple associated endpoint devices. For example, user 160 may have both a personal smart phone (e.g., endpoint device 170A) as well as a work smart phone assigned by an employer (e.g., endpoint device 170B). Similarly, user 161 may have both a mobile phone (e.g., endpoint device 171A) as well as a personal computer (e.g., endpoint device 170B). In addition, user 162 may also have a personal smart phone (e.g., endpoint device 172A) as well as a work smart phone assigned by an employer (e.g., endpoint device 172B).

Notably, one or more of the users 160-162 may be a subscriber of access network 120 and/or core network 110. In other words, the user is already a customer of the network service provider that provides one or more communication services such as cellular phone services, voice over IP services, long distance telephony services, Internet access services, data services, multimedia delivery services, and the like.

Accordingly, in one embodiment DB 116 of AS 115 in the core network 110 may store privacy information of one or more of users 160-162, e.g., users who are also network subscribers. Taking user 160 as an example, the privacy information stored in DB 116 may include location information, travel companion information and event information. Additionally, privacy information may also include a name, billing address, service address, telephone number and email address associated with user 160. The privacy information may also include geographic location information regarding user 160. For example, location information may be determined from a source IP address associated with communications from user 160, global positioning system (GPS) information of a mobile device of the user, serving base station information, and so forth. The privacy information stored in DB 116 may also comprise biographic information, e.g., age, memberships in various groups, professional associations, and so forth, as well as calendar information for the user 160. The privacy information may also include a contact list of the user 160 that may comprise various contacts in various categories including: friends, family, colleagues, sports team members, hobby group members, and so forth. Finally, the privacy information may also include consent information or data associated with how the privacy information can be used in analytics in response to third party business inquiries.

Application server (AS) 115 may also access and/or store in DB 116 call detail records (CDRs) derived from telephone calls, emails, text messages, instant messages, multimedia messages (MMS), VoIP application usage, and the like which traverse various networks including core network 110, access networks 120 and 122, and so forth. Such CDRs may be gathered and accessed using any techniques which are known in the art and may be used for various purposes in accordance with the present disclosure, as described in greater detail below. Furthermore, AS 115 may also have access to various other services that the user may have subscribed to. For example, the user may also have one or more subscriptions to a multimedia content delivery service, e.g., requesting movies to be streamed to the user, an Internet access service, a data delivery service, a health wellness monitoring service, a financial planning service, a banking service, an online product purchase service, a home monitoring service, a home or business security service, a remote network access service and so on. It should be noted that the above list of subscribed services is only illustrative, but is not intended to be exhaustive.

In turn, Application server (AS) 115 may also access and/or store in DB 116 the consents as to the use of the user's privacy information in any one of the subscribed services. In other words, Application server (AS) 115 may serve as a centralized platform for storing the consents as to the use of the user's privacy information. This allows the Application server (AS) 115 to perform analytics on the user's privacy information as part of the privacy information management service and/or search service provided to the user as further discussed below. Furthermore, Application server (AS) 115 may also enhance the user's data experience in terms of privacy information management for improving search results as discussed below.

In addition, each of the users 160-162 may participate in social networking via social network 130. Thus, each of the users 160-162 may have a social network privacy information that includes: posts and messages of the user, biographic information of the user, information on contacts of the user and/or other participants of the social network with whom the user has interacted, location/check-in information of the user, and so forth. In one example, the social network privacy information of each of the users 160-162 may be stored in database (DB) 126 of application server (AS) 125. Collectively, the information stored in DB 126 may be referred to as social network information and may be used for supplementing the privacy information as stored by AS 115 in DB 116. In one embodiment, the location information, travel companion information and event information of a user may be stored in DB 126.

For instance, application server (AS) 115 may access the social network information from AS 125/DB126 and use such information as an alternative to or in conjunction with stored privacy information in DB 116 and call detail record information available to AS 115 to automatically respond to search requests presented by the user. For example, the user may have certain subscription to services that are provided or identified via the social network, which may further have associated privacy information of the user. Such privacy information of the user can be extracted from the social network by AS 115 and stored in the DB 116 if consent is provided by the subscriber to perform such extraction, thereby saving time for the user in having to provide privacy information again to AS 115.

Alternatively, in one example privacy information of the user can be extracted from the core network by AS 125 and stored in the DB 126. In other words, the functions or operations of the present disclosure can be deployed in the AS 125 of the social network as well.

FIG. 1 also shows a third party server 150 with a DB 156, which may be operated by a third party business entity (broadly a business entity), e.g., a hotel, a motel, a bed and breakfast establishment, an airline, a bus carrier company such as Greyhound Lines™, a train carrier company such as Amtrak®, a restaurant, a bakery, a deli, a theater, a sports team, a sports ticket outlet, a health club, a medical service provider, a hospital, a bank, a mortgage company, a retailer or vendor for providing a product to the user, e.g., a department store, a supermarket, an online retailer and so on. It should be noted that although only one third party server 150 is shown in FIG. 1 for clarity reasons, any number of third party servers can be represented in FIG. 1.

Furthermore, it should be noted that the network 100 has been simplified. For example, the network 100 may include other network elements (not shown) such as border elements, routers, switches, policy servers, security devices, gateways, a content distribution network (CDN), firewalls, and the like. Thus, FIG. 1 is only intended to illustrate one example environment in which embodiments of the present disclosure may be employed.

In one embodiment, the user provides privacy information to the communication network operated by the network service provider to be managed via a privacy information management service and/or a search service for providing search results in response to a search request received from the user. Privacy information may comprise: 1) geo-location information, e.g., the current physical location of the user, 2) multimedia content consumption information, e.g., the type of content such as movies and/or programs watched and preferred by the user, 3) viewing schedule information, e.g., time schedule that the user is watching or prefers to watch the content, e.g., 9:00 pm on a Sunday and so on, 4) medication information, e.g., medication purchased by the user, 5) medical information, e.g., medical conditions associated with the user, medical services used by the user, e.g., hospitals and medical clinics, 6) delivery of product information, e.g., the time and day that a product is delivered to the user, 7) financial information, e.g., banking information, mortgage information, credit information, credit card information and the like, 8) biometric information, e.g., the current body temperature of the user, the current weight of the user, the current shoe size of the user, the current height of the user, and the like, 9) appointment information of the user, e.g., events on a calendar of the user, 10) communication information, e.g., individuals that the user has communicated with via phone calls, emails, text messages, the preferred modality of communication, e.g., texting, emails, cellular calls, and the like, 11) contact information, e.g., phone numbers of contacts (e.g., friends, family and co-workers), email addresses of contacts, home addresses of contacts, 12) lodging preferences (e.g., types of hotels, brand of hotel chains, types of rooms, smoking or non-smoking rooms, and so on), 13) traveling preferences (e.g., types of transportation mode (e.g., planes, trains, buses, or types of rental cars), brand of airlines, bus carriers, train carriers, types of seating, types of travel locations, types of landmarks to be visited when traveling, and so on), 14) eatery preferences (e.g., types of restaurants, types of food, types of spices to be applied to food, range of costs willing to be incurred for food and drink, locations of eateries), 15) entertainment preferences (e.g., types of sports, types of shows, types of movies, types of television programming, types of music), 16) any location information not included in the geo-location information, 17) travel companion information, 18) event information, and so on. Again, this list of privacy information is only illustrative and should not be deemed to be an exhaustive list.

Given the need of the innate functionality of a user procuring various services and making various product purchases, a user may have to provide certain portions of the privacy information to be used by one or more business entities. In one embodiment, the user will submit a search request to a network service provider and location information, travel companion information and event information will then be utilized to provide search results responsive to the search request.

In one embodiment, the present disclosure provides a privacy information management service and a search service to be offered by a network service provider. For example, a user will provide privacy information to be stored on a communication network of the network service provider. For example, the privacy information can be manually provided to the network service provider, e.g., answering a survey with a plurality of questions. In another example, the privacy information can be automatically extracted by the network service provider, e.g., monitoring the user's commercial transaction activities (e.g., commercial transactions in procuring goods or services) over the communication network, monitoring the user's communication activities (e.g., email communications, text messaging activities, phone records, and the like), and so on. In other words, if the network service provider is providing Internet access service to the user, then the network service provider may monitor the transactions made by the user over the Internet. Similarly, if the network service provider is providing cellular service or data service to the user, then the network service provider may monitor the communication activities and transactions made by the user over the cellular service or data service. Any such automatic monitoring must be in accordance with receiving an affirmative consent by the user as part of the privacy information management service. In one embodiment, the location information, travel companion information and/or event information can be provided by the user sending the search request. This allows the user to consolidate his or her privacy information in one centralized platform to be better served in terms of receiving better focused search results. Namely, the network service provider is tasked with performing analytics on the privacy information to respond to search requests received from the users.

For example, a user is traveling to Las Vegas for a convention and is traveling with a coworker. The user has arrived at Las Vegas and is searching for a restaurant to have dinner with the user's companion. The user may submit the search request for a restaurant recommendation to a network service provider that has stored or obtained the privacy information of the user. In one example, the privacy information may comprise the location information of the user, travel companion information relating to the coworker and event information pertaining to the convention. In turn, a search engine, e.g., deployed in AS 115, will utilize the location information, travel companion information and event information to respond to the user's search request for providing the search results. In one example, any privacy information provided along with the search request can be requested by the user to be stored indefinitely, stored for a defined period of time, or to be deleted immediately after the search results are provided to the user.

Figure 2:
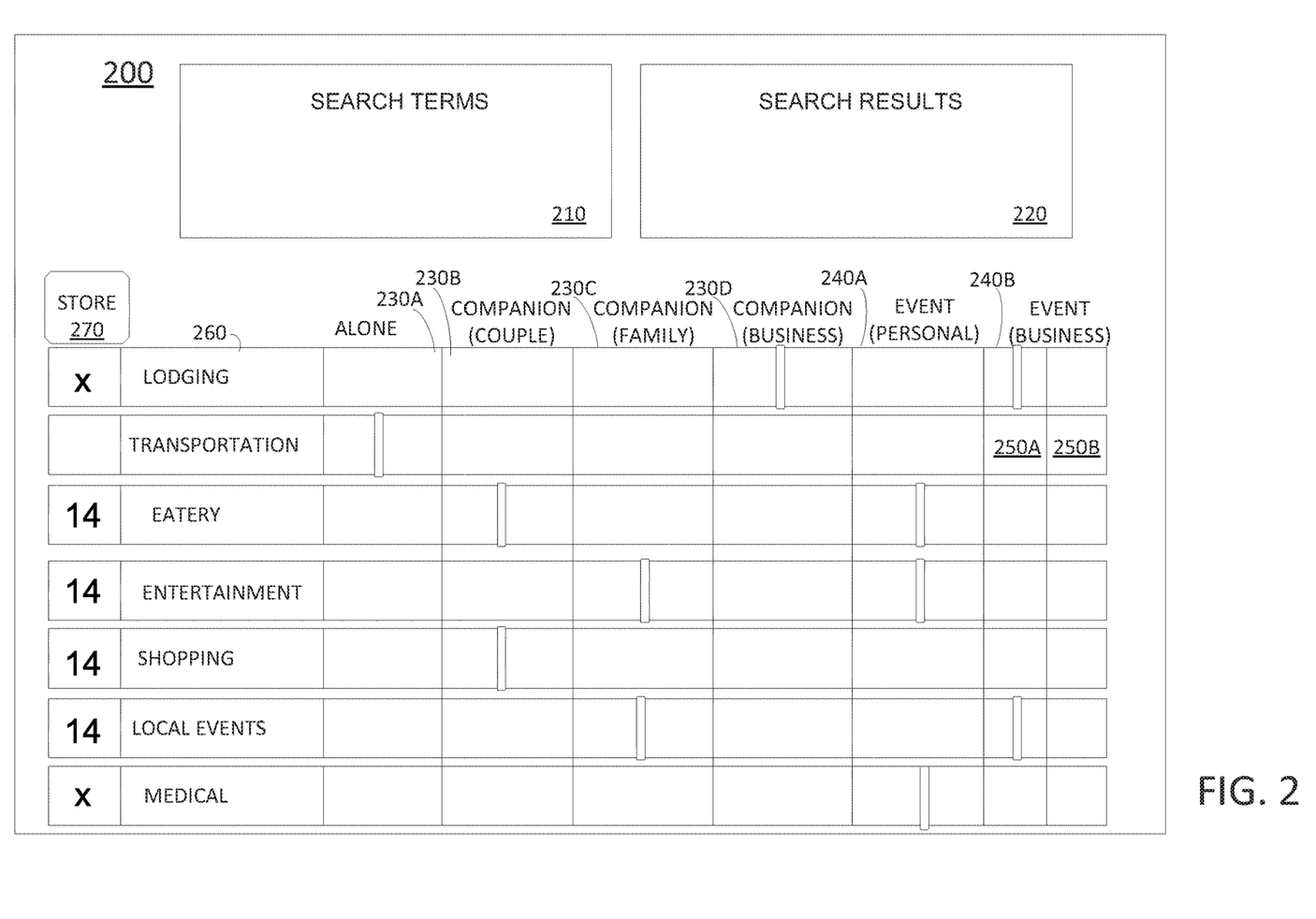
FIG. 2 illustrates a user interface showing a user's preference as to how the user's privacy information is to be used in a search request.

FIG. 2 illustrates a user interface or screen 200 where a user can submit a search request including the ability to provide travel companion information and event information. In one embodiment, location information is automatically sent by the endpoint device, e.g., a cellular phone or a smartphone, of the user. For example, when the user interface or screen 200 is launched, the underlying software application may ask the user for permission to allow the software application to use the user's location information. When the user provides his or her consent, then the underlying software application will send the location information when the user enters a search request in field 210. Alternatively, if the search terms contain location information as well, then the location information in the search terms may be used instead of the geo-location information associated with the user. For example, if the user is currently in Seattle, and the search terms are "find me an Italian restaurant in Manhattan, New York City," then the location information "Manhattan, New York City" will be used in generating the search results instead of Seattle, which is the user's current location information.

FIG. 2 illustrates an interface where the user may provide traveling companion information 230A-230D. For example, the user may indicate whether the user is currently: 1) alone 230A or 2) traveling with at least one companion 230B-D. In one example, the user may provide further granularity for the traveling companion information, i.e., 1) the user is traveling as a couple 230B, 2) the user is traveling as a family 230C, or 3) the user is traveling with a companion for business 230D.

Similarly, FIG. 2 also illustrates an interface where the user may provide event information 240A-240B. For example, the user may indicate whether the user is currently attending a type of event, e.g., 1) a personal event or 2) a business event. In one example, the user may provide further granularity for the event information, i.e., at a business event with a client 250A (e.g., a more important business event) or at a business event with a vendor 250B (e.g., a less important business event). The notion of the degree of importance of a business event is relative and can be defined by the user and/or the network service provider responding to the search request. Said another way, the degree of importance can be set between a range from 1-10, or from a range of words (e.g., very high importance, high importance, average importance, low importance and very low importance). Furthermore, it should be noted that any number of sub-events can be defined for the event information 240A-240B.

In one embodiment, the traveling companion information and the event information can be correlated to various search topics 260, e.g., "lodging," "transportation," "eatery," "entertainment," "shopping," "local events," and "medical." It should be noted that these illustrative search topics are only illustrative and not intended to be exhaustive.

In one embodiment, the user is able to provide the traveling companion information and the event information in the context of a search topic. Referring to FIG. 2, the user has indicated with respect to the search topic of "lodging," the user is traveling with a companion for business and the event being attended is a business event. Thus, when the user enters in the search field 210 the search terms "find me an inexpensive hotel," the search engine will take into consideration the current location of the user, the traveling companion information indicating that the user is traveling with a companion for business, and the event information indicating that the event being attended is a business event. The use of all three types of information will produce a more focused set of search results, e.g., pushing down the list of results for hotels having only rooms with a single bed. As shown in FIG. 2, the traveling companion information and the event information can also be correlated with search topics relating to: transportation (e.g., "find me a flight," "find the next train leaving the terminal," and so on), eatery (e.g., "find me a brewery specializing in IPA beer," "find me a restaurant specializing in barbecue," and so on), entertainment (e.g., "find me a professional sports game with available tickets," "find me an art museum with a traveling collection," and so on), shopping (e.g., "find me a store with leather jackets on sale," "find me a store with a store wide saving of 30% off," and so on), local events (e.g., "find me a street fair," and so on), and medical (e.g., "find me a 24 hour clinic," and so on).

As shown in FIG. 2, the user may simply select the pertinent setting of the traveling companion information and event information against one or more search topics 260, e.g., moving one or more tabs under the relevant column(s). Once set, when the user submits a search request, the corresponding location information, traveling companion information and event information will be automatically sent along with the search request. The search results will be presented in field 220. In one embodiment, the user may only elect to present the search request with location information and either the traveling companion information or the event information, but not both.

Finally, the user may also dictate how the traveling companion information and event information will be treated by the network service provider via a "store" parameter 270 that will indicate how the traveling companion information and event information will be stored, if at all. For example, the user may provide a mark, e.g., an X, next to each search topic in which the network service provider will not retain the traveling companion information and event information once the search results are presented. Alternatively, the user may not care if the traveling companion information and the event information will be stored by the network service provider, e.g., the search topic "transportation" does not require the network service provider to delete the traveling companion information and the event information. In this illustrative example, the user may want the network service provider to learn over time the user's travel patterns and to provide better search results by retaining the traveling companion information and the event information, e.g., the user always travel to the same business event with an associate of the firm and so on. Finally, the user may set a predefined time period in which the traveling companion information and the event information will be retained by the network service provider. For example, the user may select a number of days in which the traveling companion information and the event information will be stored and retained by the network service provider, e.g., 14 days as shown in FIG. 2 for the search topics: eatery, entertainment, shopping, and local events. However, it should be noted that this is only an example and should not interpreted as a limitation.

Figure 3:
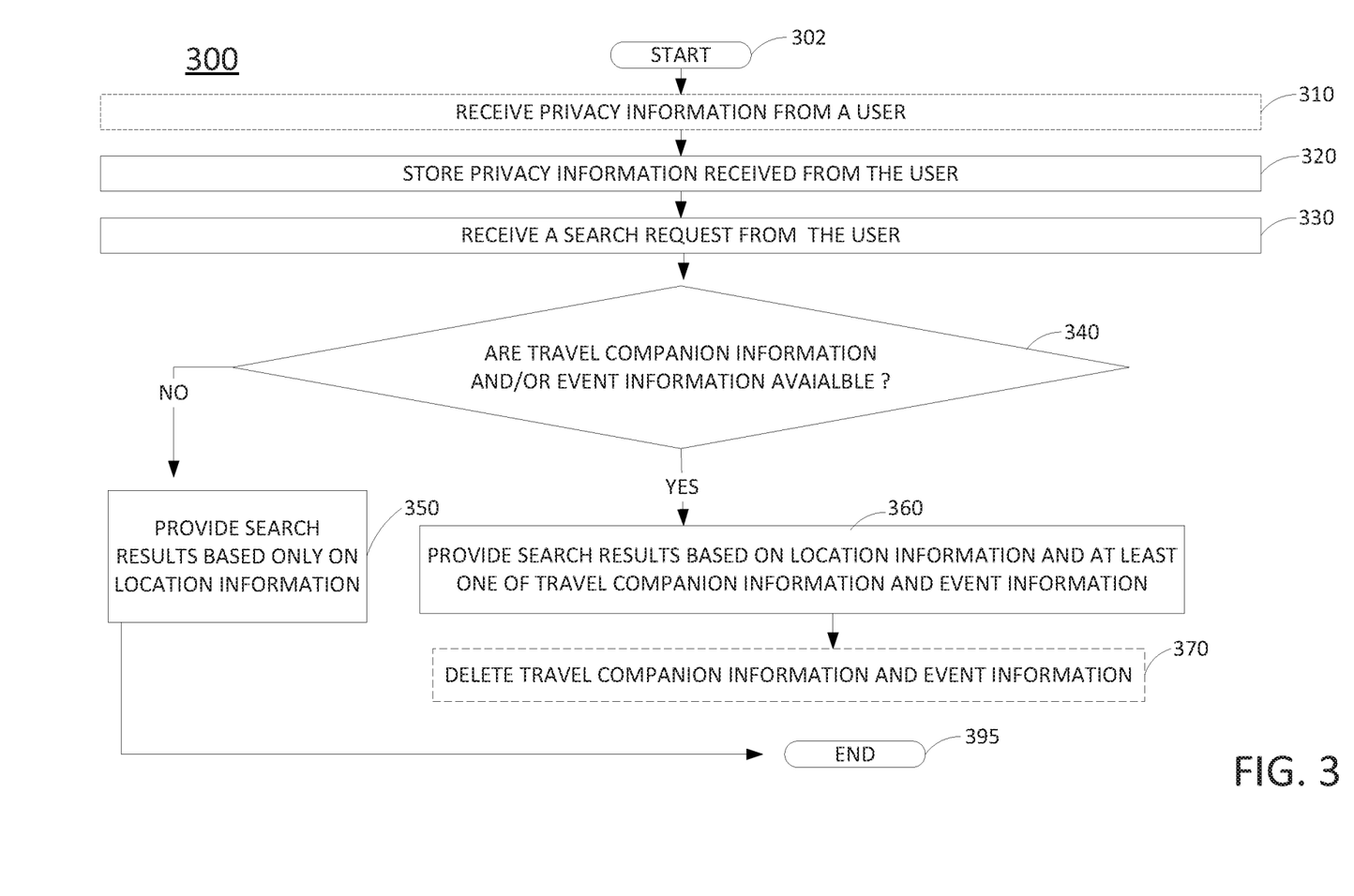
FIG. 3 illustrates a flowchart of an example method for utilizing privacy information to improve a user experience in accordance with the present disclosure.

FIG. 3 illustrates a flowchart of an example method 300 for utilizing privacy information to improve a user experience in accordance with the present disclosure. For example, the method utilizes location information, traveling companion information and event information in responding to a search request submitted by a user. In one embodiment, steps, functions and/or operations of the method 300 may be performed by a network-based device, e.g., application server 115 or application server 125, in FIG. 1. In another embodiment, steps, functions and/or operations of the method 300 may be performed by a user endpoint device, e.g., endpoint device 170A or 170B in FIG. 1, or by a network-based device in conjunction with a user endpoint device. In one embodiment, the steps, functions, or operations of method 300 may be performed by a computing device or system 400, and/or processor 402 as described in connection with FIG. 4 below. For illustrative purpose, the method 300 is described in greater detail below in connection with an embodiment performed by a processor, such as processor 402. The method begins in step 302 and proceeds to step 310.

At optional step 310, the processor receives privacy information directly from the user. However, as discussed above, the privacy information can be extracted instead over time from activities (e.g., communication activities and/or transaction activities) conducted by the user over the communication network operated by the network service provider. Alternatively, the privacy information can also be obtained from an application server of a social network. In other words, some of the privacy information may already exist in a user profile of a social network account of a social network service provider. The user can then authorize the network service provider to directly obtain the user profile from the social network service provider. In one example, the privacy information comprises one or more of: location information, traveling companion information and event information, e.g., sent along with a search request or obtained from other mechanisms.

At step 320, the processor stores privacy information received directly from the user or through other mechanisms. For example, the privacy information for a plurality of users can be stored in DB 116 under the control of application server 115. In one example, the duration of time for storing the various types of privacy information at the communication network of the network service provider is at the discretion of the user.

At step 330, the processor receives a search request (e.g., a request for locating a service, a product or information associated with a search topic). For example, the user is looking for a hotel room, a restaurant, a flight, a train schedule, a list of local events, and so on. In one example, the user is using his or her mobile endpoint device to send the search request to the network service provider.

At step 340, the processor determines whether traveling companion information and/or event information are available that are associated with the user. If the answer is positive at step 340, the processor will proceed to step 360 where the processor will provide the search results to account for the location information, the traveling companion information and the event information associated with the user. Said another way, the listing of various results responsive to the user request will be such that the traveling companion information and/or the event information will affect the ordering of the listing of various results. Search results that are more consistent with the traveling companion information and/or the event information will be listed first or at the top of the order. This allows the user to see pertinent search results first, thereby enhancing the user experience.

Returning to step 340, if the answer is negative at step 340, the processor will proceed to step 350 where the processor will provide the search results based only on the location information. In other words, if the user submits a request for "find me a hotel," the search engine will use the location information to locate hotels near a location specified by the user's location information.

At optional step 370, the processor may delete the traveling companion information and/or the event information from the storage device. For example, the user may indicate that the traveling companion information and/or the event information can only be used for generating the search results and once the search results are provided, the traveling companion information and/or the event information must be deleted. Alternatively, the user may indicate that the traveling companion information and/or the event information can only be used for generating the search results and are to be stored for a time period defined by the user. Once the time period expires, the traveling companion information and/or the event information must be deleted. Method 300 ends in step 395.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

As such, the present disclosure provides at least one advancement in the technical field of privacy information management. This advancement allows for a dedicated system to use the user's privacy information as a mechanism to provide a more focused search that is responsive to a user search request. The present disclosure also provides a transformation of data. For example, privacy information is transformed into a mechanism to provide search results.

Finally, embodiments of the present disclosure improve the functioning of a computing device, e.g., a server and/or a user endpoint device. Namely, a server or endpoint device dedicated for performing searches is able to utilize privacy information to improve a user experience.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for utilizing privacy information to improve a user experience, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for utilizing privacy information to improve a user experience (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for utilizing privacy information to improve a user experience (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
receiving, by a processor of a network service provider, privacy information associated with a user, the privacy information comprising location information of the user, traveling companion information of the user, and event information of the user, wherein the traveling companion information indicates the user is traveling with at least one companion, wherein the traveling companion information further indicates that the at least one companion comprises a business companion;
receiving, by the processor and over a communication network associated with the network service provider, a search request;
performing, by the processor, a search responsive to the search request to generate search results, wherein the search results are generated by accounting for the location information, the traveling companion information, and the event information in accordance with at least one setting that is selected by the user for permitting the use of the location information, the traveling companion information, and the event information in connection with a particular search topic of the search request, wherein different settings for permitting the use of the location information, the traveling companion information, and the event information are associated with different search topics; and providing, by the processor and over the communication network associated with the network service provider, the search results to an endpoint device of the user.

2. The method of claim 1, wherein the privacy information is received from the user along with the search request.

3. The method of claim 1, wherein the privacy information is extracted from a user profile obtained from a social network.

4. The method of claim 1, wherein the privacy information is extracted from activities conducted by the user over the communication network.

5. The method of claim 4, wherein the activities comprise communication activities.

6. The method of claim 4, wherein the activities comprise commercial transaction activities.

7. The method of claim 1, wherein the event information indicates that the user is attending a personal event.

8. The method of claim 1, wherein the event information indicates that the user is attending a business event.

9. The method of claim 1, further comprising:
storing, by the processor, the traveling companion information and the event information in a database of the communication network.

10. The method of claim 1, further comprising:
storing, by the processor, the traveling companion information and the event information in a database of the communication network for a time duration defined by the user.

11. The method of claim 1, further comprising:
deleting, by the processor, the traveling companion information and the event information once the search results are provided to the endpoint device of the user.

12. A non-transitory computer-readable storage medium storing instructions which, when executed by a processor of a network service provider, cause the processor to perform operations, the operations comprising:
receiving privacy information associated with a user, the privacy information comprising location information of the user, traveling companion information of the user, and event information of the user, wherein the traveling companion information indicates the user is traveling with at least one companion, wherein the traveling companion information further indicates that the at least one companion comprises a business companion;
receiving over a communication network associated with the network service provider, a search request;
performing a search responsive to the search request to generate search results, wherein the search results are generated by accounting for the location information, the traveling companion information, and the event information in accordance with at least one setting that is selected by the user for permitting the use of the location information, the traveling companion information, and the event information in connection with a particular search topic of the search request, wherein different settings for permitting the use of the location information, the traveling companion information, and the event information are associated with different search topics; and
providing over the communication network associated with the network service provider, the search results to an endpoint device of the user.

13. The non-transitory computer-readable storage medium of claim 12, wherein the privacy information is received from the user along with the search request.

14. The non-transitory computer-readable storage medium of claim 12, wherein the privacy information is extracted from a user profile obtained from a social network.

15. The non-transitory computer-readable storage medium of claim 12, wherein the privacy information is extracted from communication activities or commercial transaction activities conducted by the user over the communication network.

16. A device comprising:
a processor of a network service provider; and
a computer-readable medium storing instructions which, when executed by the processor, cause the processor to perform operations, the operations comprising:
receiving privacy information associated with a user, the privacy information comprising location information of the user, traveling companion information of the user, and event information of the user, wherein the traveling companion information indicates the user is traveling with at least one companion, wherein the traveling companion information further indicates that the at least one companion comprises a business companion;
receiving over a communication network associated with the network service provider, a search request;
performing a search responsive to the search request to generate search results, wherein the search results are generated by accounting for the location information, the traveling companion information, and the event information in accordance with at least one setting that is selected by the user for permitting the use of the location information, the traveling companion information, and the event information in connection with a particular search topic of the search request, wherein different settings for permitting the use of the location information, the traveling companion information, and the event information are associated with different search topics; and
providing over the communication network associated with the network service provider, the search results to an endpoint device of the user.

17. The device of claim 16, wherein the privacy information is received from the user along with the search request.

18. The device of claim 16, wherein the privacy information is extracted from a user profile obtained from a social network.

19. The device of claim 16, wherein the privacy information is extracted from communication activities or commercial transaction activities conducted by the user over the communication network.

20. The device of claim 16, the operations further comprising:
storing the traveling companion information and the event information in a database of the communication network for a time duration defined by the user.

* * * * *